United States Patent
Egi (12)

(10) Patent No.: US 12,231,065 B2
(45) Date of Patent: Feb. 18, 2025

(54) POSITION CONTROL DEVICE

(71) Applicant: OKUMA Corporation, Aichi (JP)

(72) Inventor: Yoshimasa Egi, Aichi (JP)

(73) Assignee: OKUMA CORPORATION, Aichi (JP)

( * ) Notice: Subject to any disclaimer, the term of this patent is extended or adjusted under 35 U.S.C. 154(b) by 183 days.

(21) Appl. No.: 17/959,595

(22) Filed: Oct. 4, 2022

(65) Prior Publication Data
US 2023/0107710 A1 Apr. 6, 2023

(30) Foreign Application Priority Data

Oct. 6, 2021 (JP) .................................. 2021-164477

(51) Int. Cl.
| | |
|---|---|
| H02P 21/00 | (2016.01) |
| H02P 21/18 | (2016.01) |
| H02P 27/12 | (2006.01) |

(52) U.S. Cl.
CPC .............. *H02P 21/18* (2016.02); *H02P 27/12* (2013.01); *H02P 2207/05* (2013.01)

(58) Field of Classification Search
CPC ...... H02P 21/18; H02P 27/12; H02P 2207/05; H02P 2203/03; H02P 6/10; H02P 6/08; H02P 25/022; H02P 6/183
See application file for complete search history.

(56) References Cited

U.S. PATENT DOCUMENTS

2011/0221382 A1    9/2011  Hayashi

FOREIGN PATENT DOCUMENTS

| | | |
|---|---|---|
| JP | 2008099444 A | 4/2008 |
| JP | 2011188633 A | 9/2011 |
| WO | WO-2018230541 A1 * 12/2018 | ............. B62D 5/046 |

OTHER PUBLICATIONS

JPO Notice of Reasons for Refusal for corresponding JP Application No. 2021-164477; Issued Nov. 5, 2024.

* cited by examiner

*Primary Examiner* — Karen Masih
(74) *Attorney, Agent, or Firm* — CANTOR COLBURN LLP

(57) ABSTRACT

In a position control device that controls a rotational speed and a rotational angle of a three-phase synchronous motor by calculating a d-axis current command value and a q-axis current command value based on a position command and causing a inverter to adjust current values of respective phases of the three-phase synchronous motor, a processor calculates a d-axis additional current value to be added to the d-axis current command value. The d-axis additional current value oscillates in such a manner that the polarity changes according to an electrical angle and crosses a zero level with an inclination whose polarity is opposite the polarity of a first q-axis current command value at a zero-cross electrical angle. As a result, positional deviation ripples caused by dead time can be suppressed.

15 Claims, 7 Drawing Sheets

MOTOR ELECTRICAL ANGLE

<Prior Art>

<Prior Art>

<Prior Art>

POSITION CONTROL DEVICE

CROSS REFERENCE TO RELATED APPLICATION

The present invention claims priority under 35 U.S.C. § 119 to Japanese Application, 2021-164477, filed on Oct. 6, 2021, the entire contents of which being incorporated herein by reference.

TECHNICAL FIELD

The present disclosure relates to the configuration of a position control device that controls the rotational speed and rotational angle of a three-phase synchronous motor.

BACKGROUND

In many cases, a position control device that controls the rotational speed and rotational angle (position) of a feed axis of an NC machine tool is configured to control a three-phase synchronous motor (may also be referred to as "motor" hereinafter) to drive a load such as a table or a workpiece connected to the motor. In this configuration, a representative example normally used as a power converter is a PWM inverter (see, JP2011-188633A).

Conventionally, in motor control, a two-phase rotary coordinate system (in which a d-axis represents the magnetic pole direction, and a q-axis represents the electrically orthogonal direction) is used to calculate two-phase voltage command values (Vd*, Vq*) for controlling the motor current. The two-phase voltage command values are further subjected to three-phase conversion to determine three-phase control voltage command values (Vu*, Vv*, Vw*). Then, through power amplification by the PWM inverter, motor driving voltages (Vu, Vv, Vw) are obtained.

FIG. 8 is a circuit diagram illustrating a voltage output part for one phase of the PWM inverter. Speedily controlling ON/OFF switching of a transistor Tr1 and a transistor Tr2 with a circuit of DC bus voltage Vdc causes an output phase voltage V to be variable between 0 and Vdc on average. A control voltage command value Vo is for commanding ON/OFF of the two transistors. The phase voltage V takes a maximum value (V=Vdc) during an ON period of the transistor Tr1 and a minimum value (V=0) during an ON period of the transistor Tr2. A diode D1 and a diode D2 are provided for reflux.

FIG. 9 illustrates the phase voltage V output in the case of switching the transistor Tr1 and the transistor Tr2 with the control voltage command value Vo. The upper side of FIG. 9 is an example of the control voltage command value Vo. A dead time Td during which both the transistors Tr1 and Tr2 are held in an OFF state is a dormant period for preventing the transistors Tr1 and Tr2 from being turned on simultaneously and causing short-circuit breakdown.

The lower side of FIG. 9 is the phase voltage V output from the PWM inverter at this time. When the current flows out (indicated by "OUT" in FIG. 9), the transistor Tr1 is OFF and current flows through the diode D2, and accordingly the output voltage is 0. When the current flows in (indicated by "IN" in FIG. 9), the transistor Tr2 is OFF and current flows through the diode D1, and accordingly the output phase voltage V is the DC bus voltage Vdc. That is, even if the same control voltage command value Vo is given to the transistors Tr1 and Tr2, the difference dependent on the current direction occurs in the output average phase voltage V.

FIG. 10 is a graph illustrating an input/output relationship for one phase of the PWM inverter, with a horizontal axis representing the control voltage command value Vo and a vertical axis representing the phase voltage V output from the PWM inverter. In the graph, each of the control voltage command value Vo and the output phase voltage V is expressed as an average voltage corresponding to ON/OFF duty. A dotted line indicates an input/output relationship when current flows out (indicated by "OUT" in FIG. 10), an alternate long and short dashed line indicates an input/output relationship when current flows in (indicated by "IN" in FIG. 10), and a solid line indicates an ideal linear characteristic.

When the current direction changes from current inflow to current outflow; the output phase voltage V transitions along an arrow 300 in FIG. 10. When the current direction changes from current outflow to current inflow, the output phase voltage V transitions along an arrow 301. Since each transition of the output phase voltage V is discontinuous, the current response is delayed correspondingly. As a result, a positional deviation DIF will occur in the position control device.

For this reason, for the purpose of letting the phase voltage V output from the PWM inverter ride on the solid line indicating the ideal linear characteristic, there is proposed dead time compensation processing (see, JP2011-188633A for example), in which a dead time compensation value −Vod is added at the time of current inflow phase and a dead time compensation value +Vod is added at the time of current outflow phase in advance to the control voltage command value Vo, to obtain the input voltage of the PWM inverter.

Hereinafter, the configuration of a conventional position control device 30 will be described with reference to FIG. 11. The position control device 30 controls the rotational speed and the rotational angle of a three-phase synchronous motor 20 (hereinafter, simply referred to as "motor 20") by causing a PWM inverter 10 to operate based on a position command value X input from an external numerical control device or the like and a signal from a position detector 21 that detects a rotational angle θm of the motor 20. The PWM inverter 10 converts DC power into three-phase AC power. The position control device 30 is a computer internally including a processor that performs information processing and a storage unit that stores programs and control data. The position control device 30 includes, as functional blocks, a position/speed control unit 2, a dq-axis current command computation unit 3, a dq-axis voltage command computation unit 4, a two-phase/three-phase conversion unit 5, a dead time compensation amount computation unit 6, a differentiator 14, an electrical angle computation unit 13, and a three-phase/two-phase conversion unit 19. Respective functional blocks can be realized when the CPU executes the programs stored in the storage unit. The differentiator 14 is a rotational angle conversion unit configured to convert the rotational angle θm (detected rotational angle) detected by the position detector 21 and output the conversion result as a rotational speed ωm of the motor 20. The electrical angle computation unit 13 calculates a motor electrical angle θ of the motor 20 from the rotational angle θm detected by the position detector 21 and outputs the calculation result. The electrical angle computation unit 13, when calculating the motor electrical angle θ of the motor 20 from the rotational angle θm detected by the position detector 21, refers to the number of poles of the motor 20 and an electrical angle offset amount.

The position/speed control unit 2 receives the position command value X, the rotational angle θm detected by the position detector 21, and the rotational speed ωm output by the differentiator 14 and performs position control loop and speed control loop feedback processing as well as various feedforward processing, to output a torque command value Tc.

The dq-axis current command computation unit 3 outputs a d-axis current command value Id* and a q-axis current command value Iq* from the torque command value Tc and the rotational speed ωm based on a known synchronous motor dq-axis control theory. In the case of a surface permanent magnetic synchronous motor (hereinafter, referred to as SPMSM), and in the case of a control method using no reluctance torque even in an interior permanent magnetic synchronous motor (hereinafter, referred to as IPMSM), it is usual that Id*=0 when the rotational speed is not high, and Id*≠0 when the IPMSM uses the reluctance torque.

The dq-axis voltage command computation unit 4 receives the d-axis current command value Id*, the q-axis current command value Iq*, a d-axis current detection value Id, and a q-axis current detection value Iq, and performs current control loop feedback processing and dq-axis control theory-based feedforward processing, to output a d-axis voltage command value Vd* and a q-axis voltage command value Vq*. To output the d-axis current detection value Id and the q-axis current detection value Iq, the three-phase/two-phase conversion unit 19 performs coordinate conversion on a U-phase current detection value Ium detected by a current detector 11 and a W-phase current detection value Iwm detected by a current detector 12 based on the motor electrical angle θ.

The two-phase/three-phase conversion unit 5 performs coordinate conversion on the d-axis voltage command value Vd* and the q-axis voltage command value Vq* with the motor electrical angle θ to output a U-phase control voltage command value Vu*, a V-phase control voltage command value Vv*, and a W-phase control voltage command value Vw*.

The dead time compensation amount computation unit 6 performs coordinate conversion on the d-axis current command value Id* and the q-axis current command value Iq* with the motor electrical angle θ to calculate U-phase, V-phase, and W-phase current command values, and calculates and outputs the above-described dead time compensation values (Vud, Vvd, Vwd) according to the current command values.

An adder 7 adds the dead time compensation value Vud to the U-phase control voltage command value Vu* and outputs a U-phase control voltage command value Vuo subjected to the dead time compensation. Similarly, an adder 8 adds the dead time compensation value Vvd to the V-phase control voltage command value Vv* and outputs a V-phase control voltage command value Vvo subjected to the dead time compensation. An adder 9 adds the dead time compensation value Vwd to the W-phase control voltage command value Vw* and outputs a W-phase control voltage command value Vwo subjected to the dead time compensation.

As described above, the PWM inverter 10 receives respective phase control voltage command values (Vuo, Vvo, Vwo) subjected to the dead time compensation and, after power amplification, outputs motor driving phase voltages (Vu, Vv, Vw). Each output phase voltage is applied to a corresponding phase of the motor 20 to generate respective phase currents (Iu, Iv, Iw).

As described above, each phase voltage of the dead time Td is variable depending on the direction of the respective phase current (Iu, Iv, Iw). Therefore, it is difficult to accurately perform the dead time compensation processing in the vicinity of zero cross where the absolute value of each phase current (Iu, Iv, Iw) is smaller. As a result, the current controllability deteriorates in the vicinity of zero cross of each phase current (Iu, Iv, Iw), and torque disturbance occurs, which leads to the positional deviation DIF. Six zero-cross points appear in total for each phase current (Iu, Iv, Iw), while the motor electrical angle makes a complete rotation. Therefore, when p represents the number of pole pairs of the motor, the torque disturbance expressed by the number of motor rotations×6×p times period: i.e., positional deviation ripples, will be generated.

In general, the disturbance suppression performance of the position control device 30 is improved as the frequency decreases. Further, when the rotational speed ωm of the motor is high, the minute current section in the vicinity of the zero cross where the torque disturbance occurs in each phase current (Iu, Iv, Iw) is shortened, and the influence of the torque disturbance becomes smaller. For this reason, in a specific section with respect to the number of motor rotations, positional deviation ripples due to the torque disturbance caused by the dead time Td become larger, which leads to deterioration of the machined surface quality.

SUMMARY

Conventionally, the influence of the problem that the machined surface quality deteriorates due to positional deviation ripples caused by the dead time has been reduced by improving the dead time compensation method. However, it is not easy to strictly detect the current direction and accurately switch the dead time compensation value, and there is a limit in the reduction of positional deviation ripples by the dead time compensation.

Accordingly, the present disclosure intends to suppress positional deviation ripples caused by the dead time in a position control device that controls the current of a three-phase synchronous motor.

The position control device of the present disclosure is a position control device that controls a rotational speed and a rotational angle of a three-phase synchronous motor by causing a PWM inverter to operate based on a position command value and a detected rotational angle detected by a position detector that detects the rotational angle of the three-phase synchronous motor, wherein a processor converts the detected rotational angle detected by the position detector into the rotational speed of the three-phase synchronous motor, calculates an electrical angle of the three-phase synchronous motor from the detected rotational angle detected by the position detector, calculates, based on the position command value, a first d-axis current command value, a d-axis additional current value to be added to the first d-axis current command value, and a first q-axis current command value, calculates a d-axis voltage command value and a q-axis voltage command value from a second d-axis current command value, which is obtained by adding the d-axis additional current value to the first d-axis current command value, and the first q-axis current command value, and converts the d-axis voltage command value and the q-axis voltage command value into control voltage command values of U, V, and W phases, and inputs the converted control voltage command values of U, V, and W phases to the PWM inverter to adjust current values of U, V, and W phases of the three-phase synchronous motor, thereby controlling the rotational speed and the rotational angle of the three-phase synchronous motor, wherein the d-axis additional current value oscillates in such a manner that the polarity changes according to the electrical angle output from an electrical angle calculation unit, and crosses a zero level with an inclination whose polarity is opposite to the polarity of the q-axis current command value at a zero-cross electrical angle where the current values of U, V, and W phases cross the zero level.

Adding, to the d-axis current command, the d-axis additional current that crosses the zero level with the inclination whose polarity is opposite to the polarity of the q-axis current command, at a motor electrical angle where each phase current crosses the zero level, as described above, can increase the absolute value of the inclination when each phase current crosses the zero level. As a result, the minute current section in which the dead time cannot be correctly compensated is shortened, and the influence of the torque disturbance becomes smaller. Therefore, the positional deviation ripples caused by the dead time can be reduced.

In the position control device of the present disclosure, the processor may calculate a first zero-cross electrical angle closest to zero among zero-cross electrical angles at which the U-phase current value crosses the zero level, by arc tangent of a ratio of the first d-axis current command value to the first q-axis current command value, calculate a revised electrical angle by subtracting the first zero-cross electrical angle from the calculated electrical angle, and calculate a phase coefficient having an amplitude of 1 and oscillating in such a way as to cross the zero level with a negative inclination when the revised electrical angle is n×60°, in which n is a natural number including zero.

As a result, it is possible to calculate the phase coefficient that oscillates in such a manner that the polarity changes according to the electrical angle and crosses the zero level, at the zero-cross electrical angle where U-, V-, and W-phase current values cross the zero level, with the inclination whose polarity is opposite to the polarity of the q-axis current command value, based on the d-axis current command value and the q-axis current command value, calculated based on the position command value, and the electrical angle output from the electrical angle calculation unit.

In the position control device of the present disclosure, there may be provided a storage unit configured to store an amplitude reference value of the d-axis additional current value, which is determined in advance. The processor may calculate a speed correction coefficient according to the rotational speed, calculate a torque command value based on the position command value, calculate a torque correction coefficient according to the torque command value, and calculate the d-axis additional current value by calculating a product of the amplitude reference value, the speed correction coefficient, the torque correction coefficient, and the phase coefficient.

As a result, it is possible to set the speed correction coefficient and the torque correction coefficient according to the rotational speed or the torque command value of the three-phase synchronous motor and set the d-axis additional current value according to the rotational speed or the torque command value.

In the position control device of the present disclosure, the processor may cause the speed correction coefficient to increase or decrease according to the rotational speed.

As a result, the d-axis additional current value can increase or decrease according to changes in the rotational speed.

In the position control device of the present disclosure, the processor may set the speed correction coefficient to be less than 1 when the absolute value of the rotational speed is equal to or less than a first speed threshold or equal to or greater than a second speed threshold that is greater than the first speed threshold, and may cause the speed correction coefficient to increase or decrease between 0 and 1 so that the speed correction coefficient becomes 1 when the rotational speed is between the first speed threshold and the second speed threshold.

As a result, the d-axis additional current value can be reduced by setting the speed correction coefficient to be smaller than 1 when the absolute value of the rotational speed is equal to or less than the first speed threshold; namely, in a region where the disturbance suppression performance of the position control device is enhanced, and when the absolute value of the rotational speed is equal to or greater than the second speed threshold; namely, in a region where positional deviation ripples caused by the dead time are sufficiently smaller. Further, since the speed correction coefficient can be held at 1 when the absolute value of the rotational speed is between the first speed threshold and the second speed threshold, it is possible to suppress an increase in positional deviation ripples due to the torque disturbance caused by the dead time in this rotational speed range, and further it is possible to suppress deterioration of the machined surface quality.

In the position control device of the present disclosure, the processor may set the speed correction coefficient to be zero when the absolute value of the rotational speed is equal to or less than a third speed threshold that is less than the first speed threshold and when the absolute value of the rotational speed is equal to or greater than a fourth speed threshold that is greater than the second speed threshold.

As a result, the d-axis additional current value can be set to zero when the absolute value of the rotational speed is further smaller and when the absolute value of the rotational speed is further greater.

In the position control device of the present disclosure, the processor may cause the torque correction coefficient to increase or decrease according to the torque command value.

As a result, the d-axis additional current value can increase or decrease according to changes in torque command value.

In the position control device of the present disclosure, the processor may cause the torque correction coefficient to increase or decrease between −1 and 1 in such a manner that, when the polarity of the torque correction coefficient is the same as the polarity of the torque command value and the absolute value of the torque command value is equal to or less than a first torque threshold, the absolute value of the torque correction coefficient increases as the absolute value of the torque command value increases, when the absolute value of the torque command value is equal to or greater than a second torque threshold that is greater than the first torque threshold, the absolute value of the torque correction coefficient decreases as the absolute value of the torque command value increases, and is held at 1 between the first torque threshold and the second torque threshold, and may set the torque correction coefficient to zero when the absolute value of the torque command value is equal to or greater than a third torque threshold that is greater than the second torque threshold.

As a result, the d-axis additional current value can be reduced by setting the absolute value of the torque correction coefficient to be smaller than 1, when the absolute value of the torque command value is equal to or greater than the second torque threshold; namely in a region where positional deviation ripples caused by the dead time become smaller. Further, the d-axis additional current value can be set to zero by setting the torque correction coefficient to zero when the absolute value of the torque command value is equal to or greater than the third torque threshold. In addition, since the absolute value of the torque correction coefficient is set to 1 when the absolute value of the torque command value is between the first torque threshold and the second torque threshold, increase in positional deviation ripples due to the torque disturbance caused by the dead time in this torque command value range can be suppressed, and deterioration of the machined surface quality can be suppressed.

In the position control device of the present disclosure, the processor may calculate, based on the position command value, the first d-axis current command value, the d-axis additional current value to be added to the first d-axis current command value, the first q-axis current command value, and a q-axis additional current value to be added to the first q-axis current command value, and may calculate the d-axis voltage command value and the q-axis voltage command value from the second d-axis current command value, which is obtained by adding the d-axis additional current value to the first d-axis current command value, and a second q-axis current command value, which is obtained by adding the q-axis additional current value to the first q-axis current command value. The q-axis additional current value may have a magnitude capable of cancelling out a torque generated by the d-axis additional current value.

As a result, it is possible to suppress the torque fluctuation that occurs when the d-axis additional current is applied and reduce positional deviation ripples caused by the dead time Td.

In the position control device of the present disclosure, the q-axis additional current value may have such a magnitude that a first calculated torque of the three-phase synchronous motor, which is calculated with d-axis current being the first d-axis current command value and q-axis current being the first q-axis current command value, is equal to a second calculated torque of the three-phase synchronous motor, which is calculated with the d-axis current being a sum total of the first d-axis current command value and the d-axis additional current value and the q-axis current being a sum total of the first q-axis current command value and the q-axis additional current value. The processor may use the following formula to calculate the q-axis additional current value, q-axis additional current value $Iqc$ $=K_2 \cdot Idc \cdot Iq_1^*/(K_1+K_2 \cdot Idc+K_2 \cdot Id_1^*)$ here, Idc represents d-axis additional current value,
$Id_1^*$ represents first d-axis current command value,
$Iq_1^*$ represents first q-axis current command value,
$K_1 = p \cdot \Phi m$,
$K_2 = p \cdot (Lq-Ld)$,
p represents the number of pole pairs of the three-phase synchronous motor,
$\Phi m$ represents permanent magnet's magnetic flux,
Ld represents d-axis inductance, and
Lq represents q-axis inductance.

The present disclosure can suppress positional deviation ripples caused by the dead time in a position control device that controls the current of a three-phase synchronous motor.

BRIEF DESCRIPTION OF DRAWINGS

Embodiment(s) of the present disclosure will be described based on the following figures, wherein.

DESCRIPTION OF EMBODIMENTS

Figure 11:
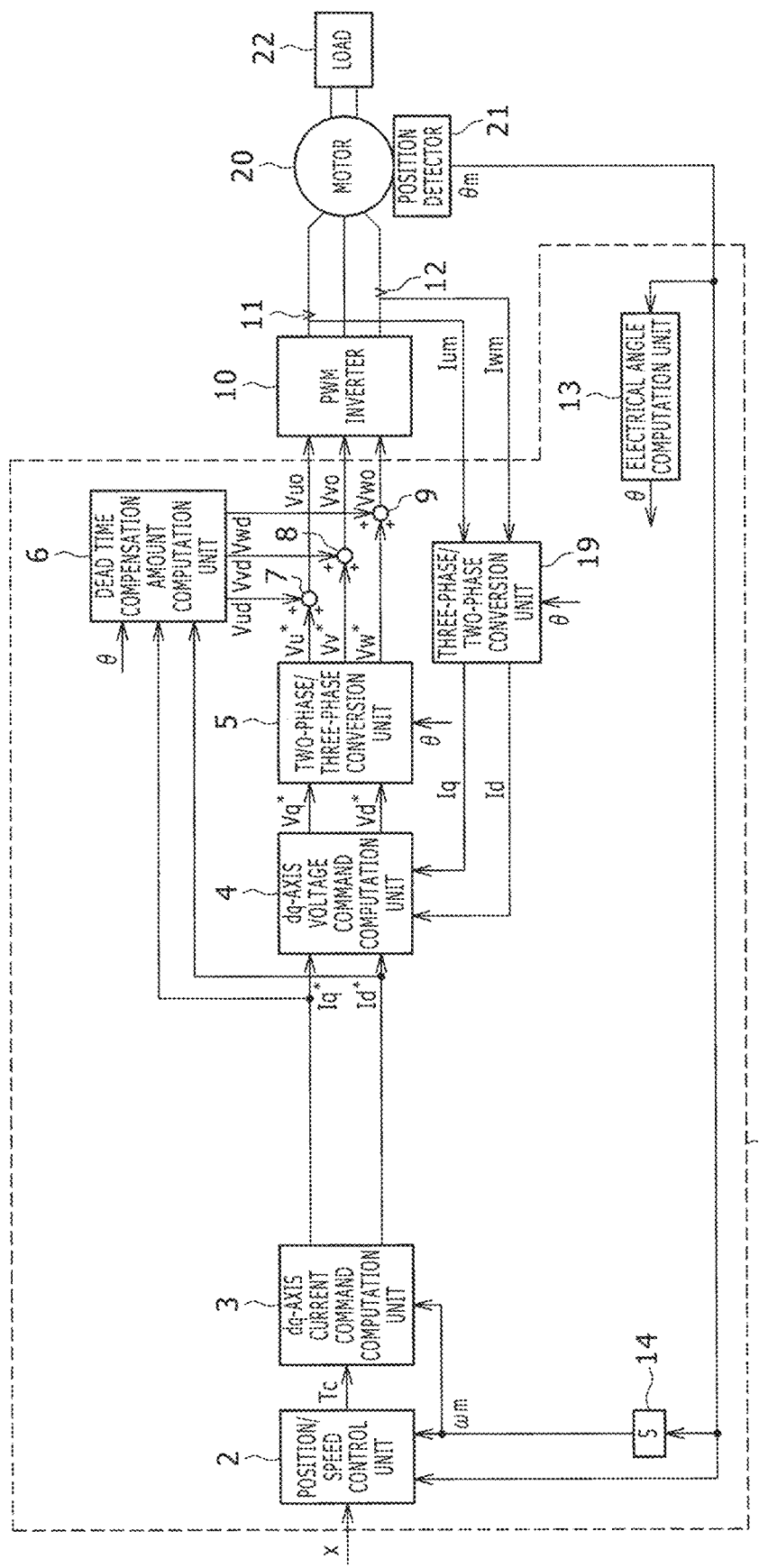
FIG. 11 is a block diagram illustrating a conventional position control device.

Hereinafter, an exemplary embodiment of a position control device 1 will be described with reference to FIG. 1. Hereinafter, in the description of FIG. 1, the same portions, or components as those of the conventional position control device 30 previously described with reference to FIG. 11 are denoted by the same reference numerals and only a brief description thereof will be given.

Figure 1:
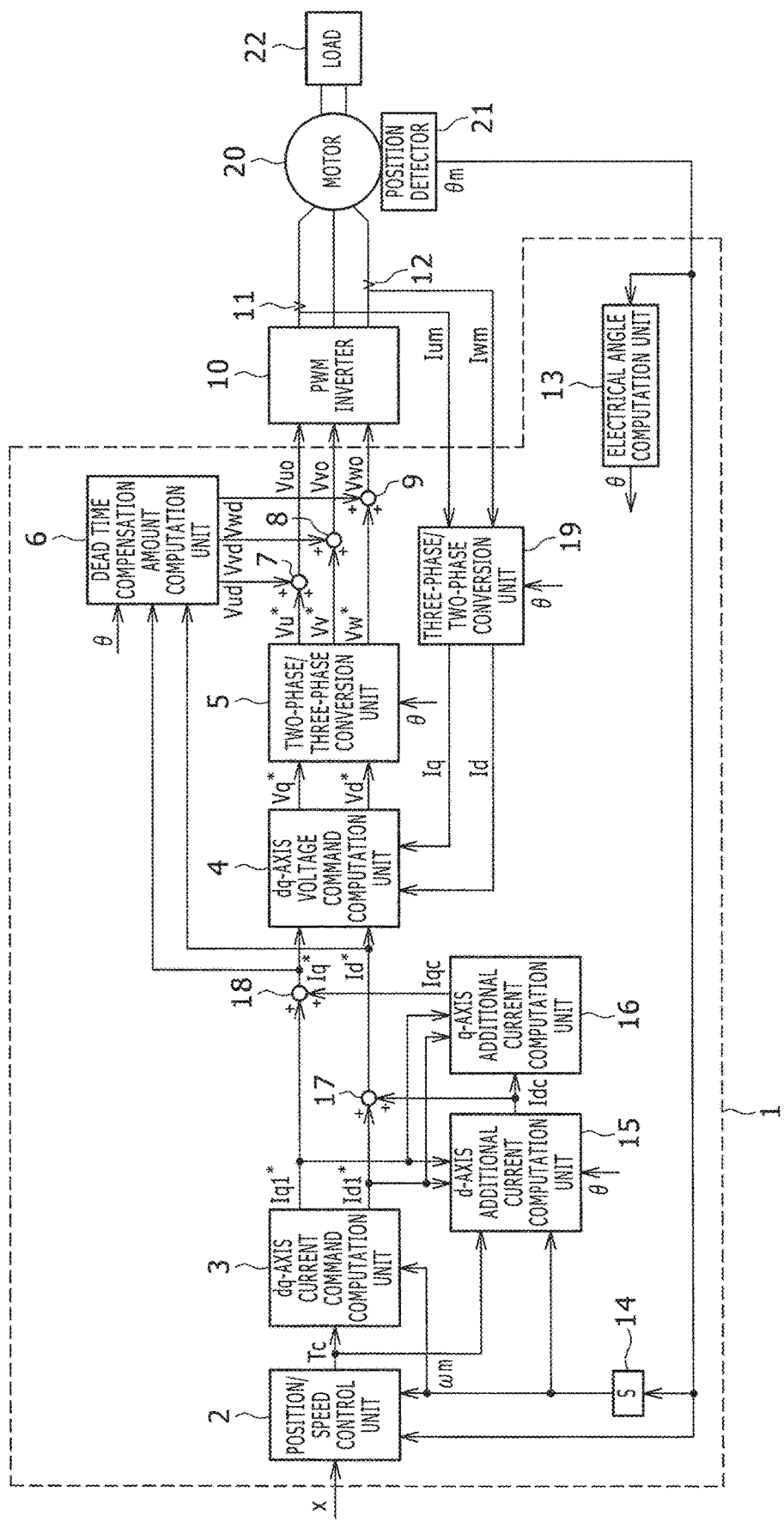
FIG. 1 is a block diagram illustrating an exemplary embodiment of a position control device.

As illustrated in FIG. 1, the position control device 1 controls the rotational speed and the rotational angle of a motor 20 by causing a PWM inverter 10 to operate based on a position command value X input from an external numerical control device or the like and a signal from a position detector 21 that detects a rotational angle θm of the three-phase synchronous motor 20 (hereinafter, referred to as motor 20). The PWM inverter 10 converts DC power into three-phase AC power. The position control device 1 is a computer internally including a processor that performs information processing and a storage unit that stores programs and control data. The position control device 1 includes, as functional blocks, a position/speed control unit 2, a dq-axis current command computation unit 3, a dq-axis voltage command computation unit 4, a two-phase/three-phase conversion unit 5, a dead time compensation amount computation unit 6, a differentiator 14, an electrical angle computation unit 13, a d-axis additional current computation unit 15, a q-axis additional current computation unit 16, and a three-phase/two-phase conversion unit 19. Respective functional blocks can be realized when the CPU executes the programs stored in the storage unit. The differentiator 14 is a rotational angle conversion unit configured to convert the rotational angle θm (detected rotational angle) detected by the position detector 21 and output the conversion result as a rotational speed om of the motor 20. The electrical angle computation unit 13 calculates a motor electrical angle θ of the motor 20 from the rotational angle θm detected by the position detector 21 and outputs the calculation result. The electrical angle computation unit 13, when calculating the motor electrical angle θ of the motor 20 from the rotational angle θm detected by the position detector 21, refers to the number of poles of the motor 20 and an electrical angle offset amount.

The position/speed control unit 2, the dq-axis current command computation unit 3, the dq-axis voltage command computation unit 4, the two-phase/three-phase conversion unit 5, the dead time compensation amount computation unit 6, adders 7 to 9, current detectors 11 and 12, and the three-phase/two-phase conversion unit 19 of the position control device 1 have the same configurations as those described with reference to FIG. 11, and therefore detailed descriptions thereof will be omitted. The position/speed control unit 2 calculates a torque command value Tc based on the position command value X input from the external numerical control device or the like and outputs the calculation result. Further, the motor 20 drives a load 22 such as a table or a workpiece.

The d-axis additional current computation unit 15 calculates and outputs a d-axis additional current value Idc. The q-axis additional current computation unit 16 calculates and outputs a q-axis additional current value Iqc. An adder 17 adds the d-axis additional current value Idc output by the d-axis additional current computation unit 15 to a d-axis current command value $Id_1^*$ output from the dq-axis current command computation unit 3 to output a d-axis current command value Id*. An adder 18 adds the q-axis additional current value Iqc output from the q-axis additional current computation unit 16 to a q-axis current command value $Iq_1^*$ output from the dq-axis current command computation unit 3 to output a q-axis current command value Iq*. The d-axis current command value Id* and the q-axis current command value Iq* are input to each of the dq-axis voltage command computation unit 4 and the dead time compensation amount computation unit 6. The d-axis additional current value Idc is an input for increasing the absolute value of inclination (dI/dt) at a zero-cross point of each phase current (Iu, Iv, Iw) and is an output of the d-axis additional current computation unit 15 described below. The q-axis additional current value Iqc is an input for compensating the torque change due to the d-axis additional current value Idc and is a calculation output of the q-axis additional current computation unit 16 described below.

The d-axis additional current computation unit 15 calculates and outputs the d-axis additional current value Idc that crosses the zero level at a motor electrical angle $θ_0$ where each phase current (Iu, Iv, Iw) crosses the zero level, with an inclination whose polarity is opposite to the polarity of the q-axis current command value $Iq_1^*$.

Figure 2:
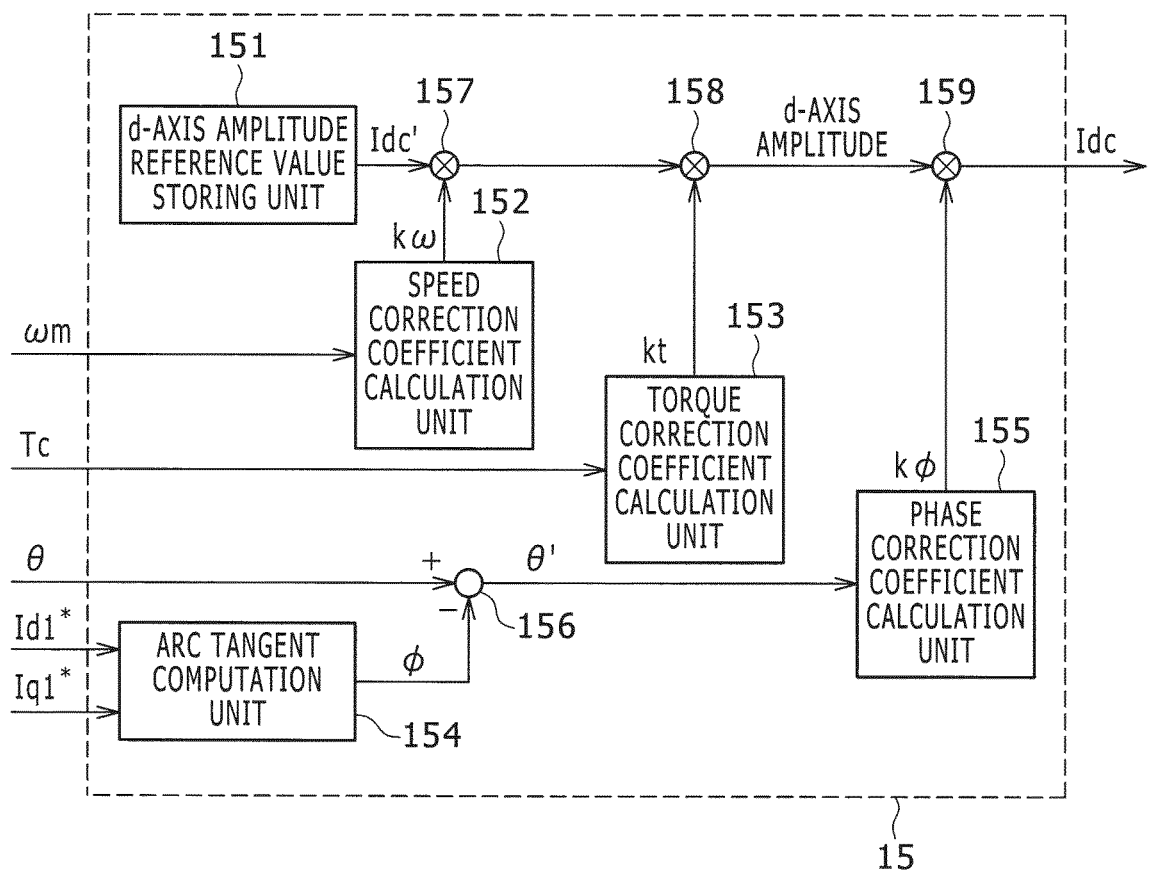
FIG. 2 is a block diagram illustrating a d-axis additional current computation unit of the exemplary position control device.

As illustrated in FIG. 2, the d-axis additional current computation unit 15 includes, as functional blocks, a d-axis amplitude reference value storing unit 151, a speed correction coefficient calculation unit 152, a torque correction coefficient calculation unit 153, a phase coefficient calculation unit 155, an arc tangent computation unit 154, a subtracter 156, and multipliers 157 to 159.

The d-axis amplitude reference value storing unit 151 can be realized by storing an amplitude reference value Idc' of Idc set in advance in the storage unit. The speed correction coefficient calculation unit 152, the torque correction coefficient calculation unit 153, the phase coefficient calculation unit 155, the arc tangent computation unit 154, the subtracter 156, and the multipliers 157 to 159 can be realized when a CPU (i.e., processor) executes the programs stored in the storage unit. The d-axis additional current computation unit 15 causes the multipliers 157, 158, and 159 to sequentially multiply the amplitude reference value Idc' stored in the d-axis amplitude reference value storing unit 151 with a speed correction coefficient kω output from the speed correction coefficient calculation unit 152, a torque correction coefficient kt output from the torque correction coefficient calculation unit 153, and a phase coefficient kΦ output from the phase coefficient calculation unit 155, and outputs the multiplication result (a product) as the d-axis additional current value Idc.

First, calculation of the phase coefficient kΦ by the phase coefficient calculation unit 155 will be described. As illustrated in FIG. 2, the phase coefficient calculation unit 155 receives a revised electrical angle θ' (=θ−φ), which is obtained by subtracting a first zero-cross electrical angle φ output from the arc tangent computation unit 154 from the motor electrical angle θ, and outputs the phase coefficient kΦ.

First, the motor electrical angle $θ_0$ where each phase current (Iu, Iv, Iw) crosses the zero level is given by the following formulae (1) and (2), when assuming that the angle at which the d-axis and the U-phase coincides is zero; i.e., θ=0.

$$θ_0=(n×60°+φ) \bmod 360° \quad (1)$$

$$\tan φ = Id_1^*/Iq_1^* \quad (2)$$

In formula (1), n is a natural number including zero.

The arc tangent computation unit 154 calculates the first zero-cross electrical angle φ closest to zero among electrical angles at which the U-phase current Iu crosses the zero level; namely n=0, among zero-cross electrical angles (n×60°+Φ) at which each phase current (Iu, Iv, Iw) calculated by formula (1) crosses the zero level, according to formula (2), i.e., φ=atan($Id_1^*/Iq_1^*$), and outputs the calculated result. Here, atan is an arc tangent function, and ($Id_1^*/Iq_1^*$) is a ratio of the d-axis current command value $Id_1^*$ to the q-axis current command value $Iq_1^*$.

The subtracter 156 subtracts from the motor electrical angle θ the first zero-cross electrical angle φ output from the arc tangent computation unit 154. The subtraction result is input, as the revised electrical angle θ'=θ−φ, to the phase coefficient calculation unit 155. Accordingly, when the motor electrical angle θ is the first zero-cross electrical angle φ at which each phase current (Iu, Iv, Iw) crosses the zero level, the revised electrical angle θ' is θ'=θ−φ=φ−φ=0.

Figure 3:
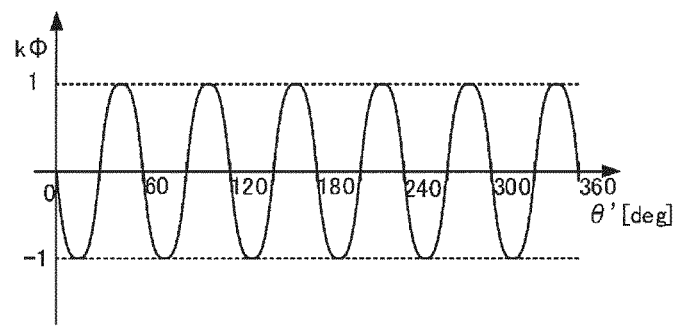
FIG. 3 is a graph illustrating an exemplary phase coefficient in the exemplary position control device.
Figure 4:
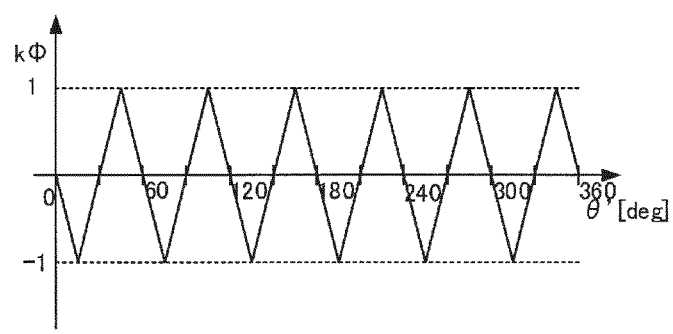
FIG. 4 is a graph illustrating another exemplary phase coefficient in the exemplary position control device.

The phase coefficient calculation unit 155 outputs the phase coefficient kΦ having an amplitude of 1 and oscillating in such a way as to cross the zero level with a negative inclination when the revised electrical angle θ' is n×60°, with respect to the revised electrical angle θ' input from the subtracter 156, in which n is a natural number including zero. The phase coefficient k is, for example, a sine wave illustrated in the graph of FIG. 3 or a triangular wave illustrated in the graph of FIG. 4. The relationship between the revised electrical angle θ' and the phase coefficient kΦ illustrated in each of FIG. 3 and FIG. 4 is merely an example, and another waveform may be used.

The speed correction coefficient calculation unit 152 outputs the speed correction coefficient kω (0≤kω≤1) according to the rotational speed ωm of the motor 20.

As described above, when the absolute value of the rotational speed ωm of the motor 20 is smaller, the disturbance suppression performance of the position/speed control unit 2 is higher and positional deviation ripples caused by the dead time Td can be suppressed. Further, when the absolute value of the rotational speed ωm of the motor 20 is larger, the inclination of each phase current (Iu, Iv, Iw) at the zero-cross point is large and the minute current section near the zero-cross point is shortened. Therefore, the positional deviation ripples caused by the dead time Td are smaller. For this reason, the d-axis additional current computation unit 15 causes the speed correction coefficient kω to increase or decrease between 0 and 1 in such a way as to reduce the d-axis additional current value Idc according to the absolute value of the rotational speed om of the motor 20, in the motor rotational speed range in which the positional deviation ripples caused by the dead time Td are smaller.

Figure 5:
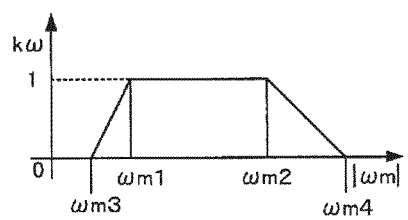
FIG. 5 is a graph illustrating changes in speed correction coefficient in relation to the absolute value of the rotational speed in the exemplary position control device.

For example, as illustrated in FIG. 5, when the absolute value of the rotational speed om of the motor 20 is not greater than a first speed threshold ωm1 or not less than a second speed threshold ωm2, the speed correction coefficient kω may be set to be smaller than 1. When the absolute value of the rotational speed om of the motor 20 is greater than the first speed threshold ωm1 and less than the second speed threshold ωm2, the speed correction coefficient kω may be set to 1.

Further, when the absolute value of the rotational speed om of the motor 20 is not greater than a third speed threshold ωm3 that is less than the first speed threshold ωm1 or when the absolute value of the rotational speed om of the motor 20 is not less than a fourth speed threshold ωm4 that is greater than the second speed threshold ωm2, the speed correction coefficient kω may be set to zero. In a region from the third speed threshold ωm3 to the first speed threshold ωm1 and a region from the second speed threshold ωm2 to the fourth speed threshold ωm4, the speed correction coefficient kω may be set to change between 0 and 1, in which third speed threshold ωm3<first speed threshold ωm1<second speed threshold ωm2<fourth speed threshold ωm4.

As a result, the d-axis additional current value Idc can be reduced by setting the speed correction coefficient kω to be smaller than 1 when the absolute value of the rotational speed om of the motor 20 is equal to or less than the first speed threshold ωm1: namely, in a region where the disturbance suppression performance of the position/speed control unit 2 is enhanced, and when the absolute value of the rotational speed om is equal to or greater than the second speed threshold ωm2: namely, in a region where positional deviation ripples caused by the dead time Td are sufficiently smaller. Further, since the speed correction coefficient kω can be held at 1 when the absolute value of the rotational speed om of the motor 20 is between the first speed threshold ωm1 and the second speed threshold ωm2, it is possible to suppress increase in positional deviation ripples due to the torque disturbance caused by the dead time Td in this rotational speed range, and further it is possible to suppress deterioration of the machined surface quality. The relationship between the absolute value of the rotational speed om and the speed correction coefficient kω illustrated in FIG. 5 is merely an example, and another mathematical function may be used.

The torque correction coefficient calculation unit 153 outputs the torque correction coefficient kt (−1≤kt≤1) according to the torque command value Tc. The torque correction coefficient kt is in a range of 0≤kt≤1 when Tc>0 and in a range of −1≤kt≤0 when Tc<0. Further, when the absolute value of the torque command value Tc is greater than a constant value, the output torque correction coefficient is kt=0.

When the absolute value of the torque command value Tc is larger, the amplitude of each phase current (Iu, Iv, Iw) is larger and the inclination at the zero-cross point increases. Accordingly, positional deviation ripples caused by the dead time Td are smaller. Therefore, according to the absolute value of the torque command value Tc, the d-axis additional current computation unit 15 may reduce the d-axis additional current value Idc in a torque range in which positional deviation ripples caused by the dead time Td are sufficiently smaller.

Figure 6:
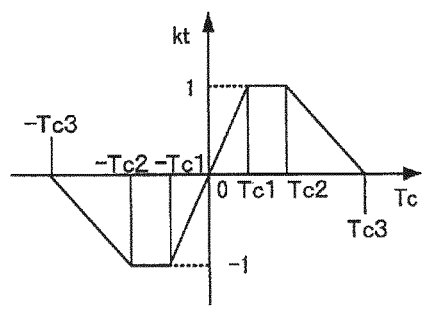
FIG. 6 is a graph illustrating changes in torque correction coefficient in relation to torque command value in the exemplary position control device.

For example, as illustrated in FIG. 6, the torque correction coefficient calculation unit 153 may cause the torque correction coefficient kt to increase or decrease between −1 and 1 in such a manner that, when the polarity of the torque correction coefficient kt is the same as the polarity of the torque command value Tc and the absolute value of the torque command value Tc is equal to or less than a first torque threshold Tc1, the absolute value of the torque correction coefficient kt increases as the absolute value of the torque command value Tc increases, when the absolute value of the torque command value Tc is equal to or greater than a second torque threshold Tc2, the absolute value of the torque correction coefficient kt decreases as the absolute value of the torque command value Tc increases, and may hold the torque correction coefficient kt at 1 between the first torque threshold Tc1 and the second torque threshold Tc2 and at zero when the absolute value of the torque command value Tc is equal to or greater than a third torque threshold Tc3, in which first torque threshold Tc1<second torque threshold Tc2<third torque threshold Tc3.

As a result, the d-axis additional current value Idc can be reduced by setting the absolute value of the torque correction coefficient kt to be smaller than 1, when the absolute value of the torque command value Tc is equal to or greater than the second torque threshold Tc2: namely, in a range where positional deviation ripples caused by the dead time Td becomes smaller. Further, the d-axis additional current value Idc can be set to zero by setting the torque correction coefficient kt to zero when the absolute value of the torque command value Tc is equal to or greater than the third torque threshold Tc3. In addition, since the absolute value of the torque correction coefficient kt is set to 1 when the absolute value of the torque command value Tc is between the first torque threshold Tc1 and the second torque threshold Tc2, increase in positional deviation ripples due to the torque disturbance caused by the dead time Td in this range of torque command value Tc can be suppressed, and deterioration of the machined surface quality can be suppressed. The relationship between the torque command value Tc and the torque correction coefficient kt illustrated in FIG. 6 is merely an example, and another mathematical function may be used.

Hereinafter, an exemplary waveform of the d-axis additional current value Idc when the phase coefficient kΦ is the sine wave illustrated in FIG. 3 is described below.

When the phase coefficient kω is the sine wave illustrated in FIG. 3, $$k\Phi = -\sin(6 \times \theta')$$

$$= -\sin(6 \times (\theta - \varphi)) \quad (6)$$

In this case, the d-axis additional current value Idc can be expressed by the following formula (7) using the amplitude reference value Idc', the speed correction coefficient kω, and the torque correction coefficient kt, described above.

$$Idc = Idc' \times k\omega \times kt \times k\Phi$$

$$= -Idc' \times k\omega \times kt \times \sin(6 \times \theta')$$

$$= -Idc' \times k\omega \times kt \times \sin(6 \times (\theta - \varphi)) \quad (7)$$

From formula (7) and formula (2), at the motor electrical angle $\theta_0$ where each phase current (Iu, Iv, Iw) crosses the zero level, Idc ($\theta_0$) becomes zero as understood from the following formula (8).

$$Idc(\theta_0) = -Idc' \times k\omega \times kt \times \sin(6 \times (\theta_0 - \varphi))$$

$$= -Idc' \times k\omega \times kt \times \sin(6 \times (n \times 60° + \varphi - \varphi))$$

$$= -Idc' \times k\omega \times kt \times \sin(n \times 360°)$$

$$= 0 \quad (8)$$

Further, at the motor electrical angle $\theta_0$ where each phase current (Iu, Iv, Iw) crosses the zero level, the inclination of Idc ($\theta_0$) is given by the following formula (9) when substituting $\theta_0$ into a formula obtained by differentiating formula (7) with the revised electrical angle $\theta'$.

$$dIdc/d\theta(\theta_0) = -6 \times Idc' \times k\omega \times kt \times \cos(n \times 360°)$$

$$= -6 \times Idc' \times k\omega \times kt \quad (9)$$

Here, according to the synchronous motor dq-axis control theory, the torque command value Tc and the q-axis current command value Iq1* match each other in polarity, and the torque command value Tc and the torque correction coefficient kt match each other in polarity, as illustrated in FIG. 6. Namely, polarity of torque command value $Tc$=polarity of $q$-axis current command value $Iq1^*$     (10)

polarity of torque command value $Tc$=polarity of torque correction coefficient $kt$     (11)

Accordingly, polarity of $q$-axis current command value $Iq_1^*$=polarity of torque correction coefficient $kt$     (12)

Further, the amplitude reference value Idc' and the speed correction coefficient kω, which are the remaining coefficients related to the d-axis additional current value Idc, are positive coefficients.

Accordingly, the d-axis additional current value Idc crosses the zero level with an inclination whose polarity is opposite the polarity of the q-axis current command value $Iq_1^*$, at the motor electrical angle $\theta_0$ where each phase current (Iu, Iv, Iw) crosses the zero level.

Figure 7:
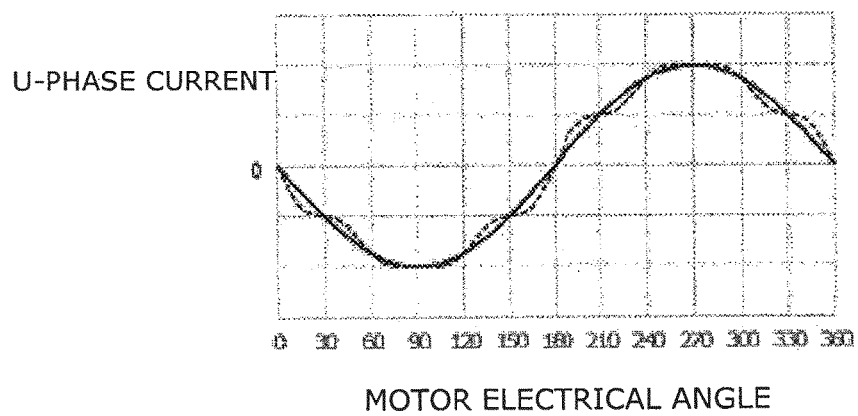
FIG. 7 is a graph illustrating changes in U-phase current command value in relation to motor electrical angle in the exemplary position control device.
Figure 8:
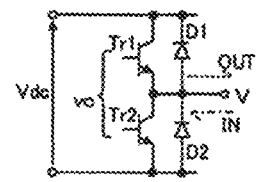
FIG. 8 is a circuit diagram illustrating a voltage output part for one phase of a PWM inverter.
Figure 9:
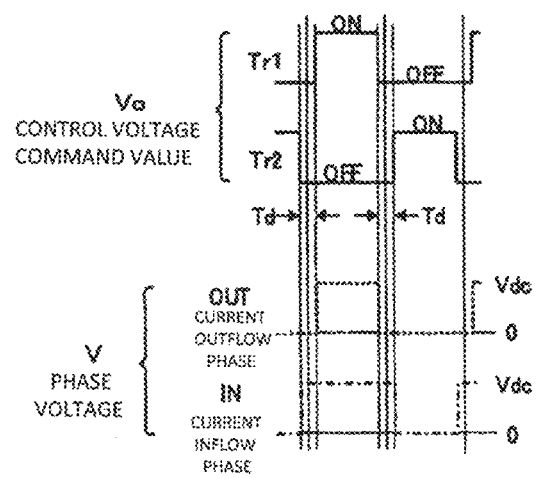
FIG. 9 is a timing diagram illustrating control voltage command value and output phase voltage for one phase of the PWM inverter.
Figure 10:
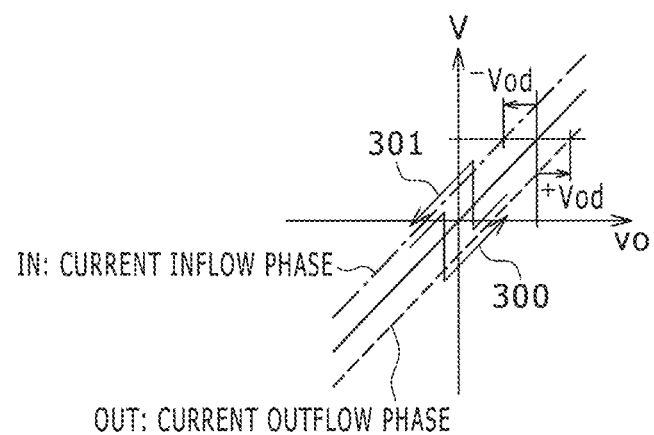
FIG. 10 is a graph illustrating an input/output relationship (control voltage command value-output phase voltage) for one phase of the PWM inverter.

FIG. 7 is a graph illustrating an exemplary change in the U-phase current Iu depending on the d-axis additional current value Idc in the case of $Id_1^*=0$ and Iqc=0 assuming SPMSM. The U-phase current Iu can be given by the following formula (13) from three-phase conversion based on the dq-axis control theory.

$$U\text{-phase current} = -Iq^* \times \sin\theta + Id^* \times \cos\theta \quad (13)$$

By substituting the q-axis current command value $Iq_1^*$ for Iq* and the d-axis additional current value Idc for Id*, $$U\text{-phase current} = -Iq_1^* \times \sin\theta + Idc \times \cos\theta$$

$$= -Iq_1^* \times \sin\theta - Idc' \times k\omega \times kt \times \sin(6 \times \theta) \times \cos\theta \quad (14)$$

Further, by substituting the condition of Idc'×kω×kt=0.15×$Iq_1^*$, $$U\text{-phase current} = -Iq_1^* \times \sin\theta$$

$$-[0.15 \times Iq1^* \times \sin(6 \times \theta)] \times \cos\theta \quad (15)$$

In FIG. 7, the solid line indicates the U-phase current Iu when Idc=0, and a dotted line indicates the U-phase current Iu when Idc=−0.15×$Iq_1^*$×sin (6×θ). The d-axis additional current value Idc increases |dIu/dt| at the zero-crossing of the U-phase current Iu. Therefore, it is possible to reduce the torque disturbance due to compensation mismatch of the dead time Td in the vicinity of zero cross of the phase current.

Next, the q-axis additional current computation unit 16 will be described. The q-axis additional current computation unit 16 calculates and outputs the q-axis additional current value Iqc capable of cancelling out the torque generated by the d-axis additional current value Idc. Torque T of the synchronous motor can be given by the following formula (3) using characteristic features of the motor 20, such as the number of pole pairs p, permanent magnet's magnetic flux Φm, d-axis inductance Ld, q-axis inductance Lq, d-axis current Id, and q-axis current Iq.

$$T = p \cdot \Phi m \cdot Iq + p \cdot (Lq - Ld) \cdot Id \cdot Iq$$

$$= K_1 \cdot Iq + K_2 \cdot Id \cdot Iq \quad (3)$$

here, $K_1 = p \cdot \Phi m$, and $K_2 = p \cdot (Lq - Ld)$.

Regarding the d-axis additional current value Idc and the q-axis additional current value Iqc, a first calculated torque T1 obtained by substituting Iq=$Iq_1^*$ and Id=$Id_1^*$ into formula (3) is equal to a second calculated torque T2 obtained by substituting Iq=$Iq_1^*$+Iqc and Id=$Id_1^*$+Idc into formula (3). Therefore, the following formula (4) can be obtained.

$$K_1 \cdot (Iq_1^* + Iqc) + K_2 \cdot (Id)^* + Idc) \cdot (Iq_1^* + Iqc)$$

$$= K_1 \cdot Iq_1^* + K_2 \cdot Id_1^* \cdot Iq_1^* \quad (4)$$

By solving formula (4), the q-axis additional current value Iqc can be expressed by the following formula (5).

$$Iqc = K_2 \cdot Idc \cdot Iq_1^* / (K_1 + K_2 \cdot Idc + K_2 \cdot Id_1^*) \quad (5)$$

In the case of SPMSM in which the d-axis current generates no torque, the q-axis additional current computation unit 16 can be omitted.

As described above, the position control device 1 according to the embodiment can suppress positional deviation ripples caused by the dead time Td and can improve the machined surface quality.

The invention claimed is:

1. A position control device (1) that controls a rotational speed (ωm) and a rotational angle (θm) of a three-phase synchronous motor (20) by causing a PWM inverter (10) to operate based on a position command value (X) and a detected rotational angle (θm) detected by a position detector (21) that detects the rotational angle (θm) of the three-phase synchronous motor (20), wherein a processor converts the detected rotational angle (θm) detected by the position detector (21) into the rotational speed (ωm) of the three-phase synchronous motor (20);

calculates an electrical angle (θ) of the three-phase synchronous motor (20) from the detected rotational angle (θm) detected by the position detector (21);

calculates, based on the position command value (X), a first d-axis current command value ($Id_1^*$), a d-axis additional current value (Idc) to be added to the first d-axis current command value ($Id_1^*$), and a first q-axis current command value ($Iq_1^*$);

calculates a d-axis voltage command value (Vd*) and a q-axis voltage command value (Vq*) from a second d-axis current command value (Id*), which is obtained by adding the d-axis additional current value (Idc) to the first d-axis current command value ($Id_1^*$), and the first q-axis current command value ($Iq_1^*$);

converts the d-axis voltage command value (Vd*) and the q-axis voltage command value (Vq*) into control voltage command values (Vuo, Vvo, Vwo) of U, V, and W phases; and inputs the converted control voltage command values (Vuo, Vvo, Vwo) of U, V, and W phases to the PWM inverter (10) to adjust current values (Iu, Iv, Iw) of U, V, and W phases of the three-phase synchronous motor (20), thereby controlling the rotational speed (ωm) and the rotational angle (θm) of the three-phase synchronous motor (20), wherein the d-axis additional current value (Idc) oscillates in such a manner that a polarity changes according to the electrical angle (θ) and crosses a zero level with an inclination whose polarity is opposite the polarity of the first q-axis current command value ($Iq_1$*) at a zero-cross electrical angle where U-, V-, and W-phase current values (Iu, Iv, Iw) cross the zero level.

2. The position control device (1) according to claim 1, wherein the processor calculates a first zero-cross electrical angle (Φ) closest to zero among zero-cross electrical angles at which the U-phase current value (Iu) crosses the zero level, by arc tangent of a ratio of the first d-axis current command value ($Id_1$*) to the first q-axis current command value ($Iq_1$*), calculates a revised electrical angle (θ') by subtracting the first zero-cross electrical angle (φ) from the calculated electrical angle (θ), and calculates a phase coefficient (kω) having an amplitude of 1 and oscillating in such a way as to cross the zero level with a negative inclination when the revised electrical angle (θ') is n×60°, in which n is a natural number including zero.

3. The position control device (1) according to claim 2, further comprising a storage unit configured to store an amplitude reference value (Idc') of the d-axis additional current value (Idc), which is determined in advance, the processor calculates a speed correction coefficient (kω) according to the rotational speed (ωm), calculates a torque command value (Tc) based on the position command value (X), calculates a torque correction coefficient (kt) according to the torque command value (Tc), and calculates the d-axis additional current value (Idc) by calculating a product of the amplitude reference value (Idc'), the speed correction coefficient (kω), the torque correction coefficient (kt), and the phase coefficient (kω).

4. The position control device (1) according to claim 3, wherein the processor causes the speed correction coefficient (kω) to increase or decrease according to the rotational speed (ωm).

5. The position control device (1) according to claim 4, wherein the processor sets the speed correction coefficient (kω) to be less than 1 when the absolute value of the rotational speed (ωm) is equal to or less than a first speed threshold or equal to or greater than a second speed threshold that is greater than the first speed threshold, and causes the speed correction coefficient (kω) to increase or decrease between 0 and 1 so that the speed correction coefficient (kω) becomes 1 when the rotational speed (ωm) is between the first speed threshold and the second speed threshold.

6. The position control device (1) according to claim 5, wherein the processor sets the speed correction coefficient (kω) to be zero when the absolute value of the rotational speed (ωm) is equal to or less than a third speed threshold that is less than the first speed threshold and when the absolute value of the rotational speed (ωm) is equal to or greater than a fourth speed threshold that is greater than the second speed threshold.

7. The position control device (1) according to claim 3, wherein the processor causes the torque correction coefficient (kt) to increase or decrease according to the torque command value (Tc).

8. The position control device (1) according to claim 7, wherein the processor causes the torque correction coefficient (kt) to increase or decrease between −1 and 1 in such a manner that, when the polarity of the torque correction coefficient (kt) is the same as the polarity of the torque command value (Tc) and the absolute value of the torque command value (Tc) is equal to or less than a first torque threshold, the absolute value of the torque correction coefficient (kt) increases as the absolute value of the torque command value (Tc) increases, when the absolute value of the torque command value (Tc) is equal to or greater than a second torque threshold that is greater than the first torque threshold, the absolute value of the torque correction coefficient (kω) decreases as the absolute value of the torque command value (Tc) increases, and is held at 1 between the first torque threshold and the second torque threshold, and sets the torque correction coefficient (kt) to zero when the absolute value of the torque command value (Tc) is equal to or greater than a third torque threshold that is greater than the second torque threshold.

9. The position control device (1) according to claim 3, wherein the processor calculates, based on the position command value (X), the first d-axis current command value ($Id_1$*), the d-axis additional current value (Idc) to be added to the first d-axis current command value ($Id_1$*), the first q-axis current command value ($Iq_1$*), and a q-axis additional current value (Iqc) to be added to the first q-axis current command value ($Iq_1$*), and calculates the d-axis voltage command value (Vd*) and the q-axis voltage command value (Vq*) from the second d-axis current command value (Id*), which is obtained by adding the d-axis additional current value (Idc) to the first d-axis current command value ($Id_1$*), and a second q-axis current command value (Iq*), which is obtained by adding the q-axis additional current value (Iqc) to the first q-axis current command value ($Iq_1$*), and the q-axis additional current value (Iqc) has a magnitude capable of cancelling out a torque generated by the d-axis additional current value (Idc).

10. The position control device (1) according to claim 9, wherein
the q-axis additional current value (Iqc) has such a magnitude that a first calculated torque of the three-phase synchronous motor (20), which is calculated with d-axis current (Id) being the first d-axis current command value ($Id_1^*$) and q-axis current (Iq) being the first q-axis current command value ($Iq_1^*$), is equal to a second calculated torque of the three-phase synchronous motor (20), which is calculated with the d-axis current (Id) being a sum total of the first d-axis current command value ($Id_1^*$) and the d-axis additional current value (Idc) and the q-axis current (Iq) being a sum total of the first q-axis current command value ($Iq_1^*$) and the q-axis additional current value (Iqc),
the processor uses the following formula to calculate the q-axis additional current value (Iqc), q-axis additional current value $Iqc$ $= K_2 \cdot Idc \cdot Iq_1^* / (K_1 + K_2 \cdot Idc + K_2 \cdot Id_1^*)$ here, Idc represents d-axis additional current value,
$Id_1^*$ represents first d-axis current command value,
$Iq_1^*$ represents first q-axis current command value,
$K_1 = p \cdot \Phi m$,
$K_2 = p \cdot (Lq - Ld)$,
p represents the number of pole pairs of three-phase synchronous motor (20),
$\Phi m$ represents permanent magnet's magnetic flux,
Ld represents d-axis inductance, and
Lq represents q-axis inductance.

11. A method for controlling a rotational speed ($\omega m$) and a rotational angle ($\theta m$) of a three-phase synchronous motor (20) by causing a PWM inverter (10) to operate based on a position command value (X) and a detected rotational angle ($\theta m$) detected by a position detector (21) that detects the rotational angle ($\theta m$) of the three-phase synchronous motor (20), comprising:
converting the detected rotational angle ($\theta m$) detected by the position detector (21) into the rotational speed ($\omega m$) of the three-phase synchronous motor (20);
calculating electrical angle ($\theta$) of the three-phase synchronous motor (20) from the detected rotational angle ($\theta m$) detected by the position detector (21);
calculating, based on the position command value (X), a first d-axis current command value ($Id_1^*$), a d-axis additional current value (Idc) to be added to the first d-axis current command value ($Id_1^*$), and a first q-axis current command value ($Iq_1^*$);
calculating a d-axis voltage command value (Vd*) and a q-axis voltage command value (Vq*) from a second d-axis current command value (Id*), which is obtained by adding the d-axis additional current value (Idc) to the first d-axis current command value ($Id_1^*$), and the first q-axis current command value ($Iq_1^*$);
converting the d-axis voltage command value (Vd*) and the q-axis voltage command value (Vq*) into control voltage command values (Vuo, Vvo, Vwo) of U, V, and W phases; and
inputting the converted control voltage command values (Vuo, Vvo, Vwo) of U, V, and W phases to the PWM inverter (10) to adjust current values (Iu, Iv, Iw) of U, V, and W phases of the three-phase synchronous motor (20), thereby controlling the rotational speed ($\omega m$) and the rotational angle ($\theta m$) of the three-phase synchronous motor (20),
wherein
the d-axis additional current value (Idc) oscillates in such a manner that a polarity changes according to the electrical angle ($\theta$) and crosses a zero level with an inclination whose polarity is opposite the polarity of the first q-axis current command value ($Iq_1^*$) at a zero-cross electrical angle where U-, V-, and W-phase current values (Iu, Iv, Iw) cross the zero level.

12. The method according to claim 11, comprising:
calculating a first zero-cross electrical angle ($\varphi$) closest to zero, among zero-cross electrical angles at which the U-phase current value (Iu) crosses the zero level, by arc tangent of a ratio of the first d-axis current command value ($Id_1^*$) to the first q-axis current command value ($Iq_1^*$),
calculating a revised electrical angle ($\theta'$) by subtracting the first zero-cross electrical angle ($\varphi$) from the calculated electrical angle ($\theta$), and
calculating a phase coefficient ($k\varphi$) having an amplitude of 1 and oscillating in such a way as to cross the zero level with a negative inclination when the revised electrical angle ($\theta'$) is n×60°, in which n is a natural number including zero.

13. The method according to claim 12, comprising:
setting an amplitude reference value (Idc') of the d-axis additional current value (Idc) in advance,
calculating a speed correction coefficient ($k\omega$) according to the rotational speed ($\omega m$),
calculating a torque command value (Tc) based on the position command value (X);
calculating a torque correction coefficient (kt) according to the torque command value (Tc), and
calculating the d-axis additional current value (Idc) by calculating a product of the amplitude reference value (Idc'), the speed correction coefficient ($k\omega$), the torque correction coefficient (kt), and the phase coefficient ($k\varphi$).

14. The method according to claim 13, comprising:
calculating, based on the position command value (X), the first d-axis current command value ($Id_1^*$), the d-axis additional current value (Idc) to be added to the first d-axis current command value ($Id_1^*$), the first q-axis current command value ($Iq_1^*$), and a q-axis additional current value (Iqc) to be added to the first q-axis current command value ($Iq_1^*$), and
calculating the d-axis voltage command value (Vd*) and the q-axis voltage command value (Vq*) from the second d-axis current command value (Id*), which is obtained by adding the d-axis additional current value (Idc) to the first d-axis current command value ($Id_1^*$), and a second q-axis current command value (Iq*), which is obtained by adding the q-axis additional current value (Iqc) to the first q-axis current command value ($Iq_1^*$),
wherein the q-axis additional current value (Iqc) has a magnitude capable of cancelling out a torque generated by the d-axis additional current value (Idc).

15. The method according to claim 14, wherein
the q-axis additional current value (Iqc) has such a magnitude that a first calculated torque of the three-phase synchronous motor (20), which is calculated with d-axis current (Id) being the first d-axis current command value ($Id_1^*$) and q-axis current (Iq) being the first q-axis current command value ($Iq_1^*$), is equal to a second calculated torque of the three-phase synchronous motor (20), which is calculated with the d-axis current (Id) being a sum total of the first d-axis current command value ($Id_1^*$) and the d-axis additional current value (Idc) and the q-axis current (Iq) being a sum total of the first q-axis current command value ($Iq_1^*$) and the q-axis additional current value (Iqc), the method uses the following formula to calculate the q-axis additional current value (Iqc),

*q*-axis additional current value *Iqc*

$$= K_2 \cdot Idc \cdot Iq_1^* / (K_1 + K_2 \cdot Idc + K_2 \cdot Id_1^*)$$

here, Idc represents d-axis additional current value,
$Id_1^*$ represents first d-axis current command value,
$Iq_1^*$ represents first q-axis current command value,
$K_1 = p \cdot \Phi m$,
$K_2 = p \cdot (Lq - Ld)$
p represents the number of pole pairs of three-phase synchronous motor (20),
Φm represents permanent magnet's magnetic flux,
Ld represents d-axis inductance, and
Lq represents q-axis inductance.

\* \* \* \* \*